United States Patent [19]
Collins

[11] 4,262,789
[45] Apr. 21, 1981

[54] WATER COOLED BRAKE HAVING MIXED BOUNDARY CONTACT BETWEEN THE TORQUE TRANSMITTING SURFACES

[75] Inventor: Marcus H. Collins, Akron, Ohio

[73] Assignee: Eaton Corporation, Cleveland, Ohio

[21] Appl. No.: 34,235

[22] Filed: Apr. 30, 1979

[51] Int. Cl.³ .................... F16D 13/74; F16D 25/064
[52] U.S. Cl. .............. 192/113 B; 192/70.12; 192/70.15; 192/85 CA
[58] Field of Search .......... 192/113 B, 113 A, 113 R, 192/70.12, 70.15, 85 CA

[56] References Cited

U.S. PATENT DOCUMENTS

| | | | |
|---|---|---|---|
| 1,248,109 | 11/1917 | Heaney . | |
| 1,978,687 | 10/1934 | Peermain et al. . | |
| 2,159,250 | 5/1939 | Brantly | 192/113 B |
| 2,889,897 | 6/1959 | Sanford et al. . | |
| 3,435,936 | 4/1969 | Warman | 192/113 B |
| 3,463,281 | 8/1969 | Aschauer | 192/113 B |
| 3,530,965 | 9/1970 | Wilson | 192/113 B |
| 3,572,477 | 3/1971 | Ewart | 192/113 B |
| 3,648,814 | 3/1972 | Barron | 192/113 B |
| 3,667,581 | 3/1970 | Hanks . | |
| 3,695,407 | 10/1972 | Peery | 192/85 CA |
| 3,915,262 | 10/1975 | Klaue | 192/113 AB |
| 4,094,393 | 6/1978 | Spokas | 192/85 CA |

*Primary Examiner*—George H. Krizmanich
*Attorney, Agent, or Firm*—R. J. McCloskey; M. L. Union

[57] ABSTRACT

A coupling includes relatively rotatable driving and driven members, and first and second torque transmitting members one of which is associated with one of the driving and driven members and the other of which is associated with the other of the driving and driven members. The first torque transmitting member includes a first torque transmitting surface which is adapted to engage with the second torque transmitting member to establish a driving relationship between the driving and driven members and a second surface disposed remote from the first surface. A first fluid passageway is provided for directing the flow of cooling fluid to directly engage with the second surface of the first torque transmitting member to effect cooling thereof and a second fluid passageway is provided for directing the flow of lubricating fluid to the first torque transmitting surface and the second torque transmitting member to provide for a mixed boundary contact therebetween when a driving relationship is established between the driving and driven members.

16 Claims, 2 Drawing Figures

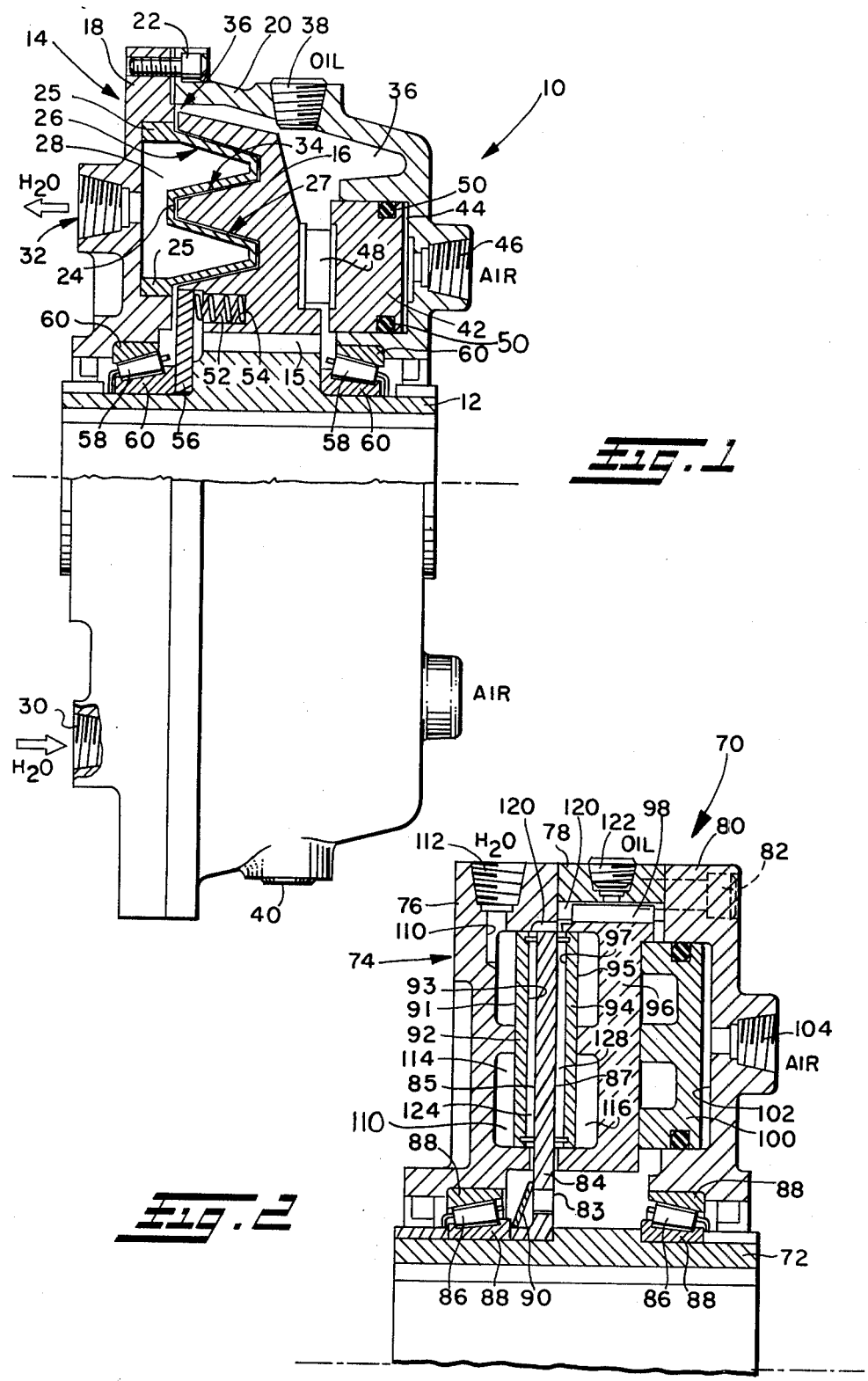

WATER COOLED BRAKE HAVING MIXED BOUNDARY CONTACT BETWEEN THE TORQUE TRANSMITTING SURFACES

BACKGROUND OF THE INVENTION

1. Field of the Invention

The present invention relates to a new and improved coupling and more particularly to a brake assembly having first and second torque transmitting members wherein a flow of cooling fluid is directed to cool one side of the first torque transmitting member and a flow of lubricant is directed to the engageable surfaces of the first and second torque transmitting members to provide for a mixed boundary contact therebetween.

2. Background of the Invention

Many known couplings are provided which utilize a fluid for cooling the torque transmitting element of the coupling. For example, the Sanford et al U.S. Pat. No. 2,889,897, discloses a liquid cooled brake wherein fluid flow is directed sequentially through the brake to effect cooling thereof and through a heat exchanger to cool the cooling fluid. Peermain et al, U.S. Pat. No. 1,978,687, discloses a clutch provided with cooling passageways therein and Hanks, U.S. Pat. No. 3,667,581, discloses a combination clutch brake having air cooling passageways disposed therein. Additionally, Heaney, U.S. Pat. No. 1,248,109, discloses a cone clutch brake in which the friction surfaces are bathed in lubricant. None of the prior art discloses a coupling wherein there is simultaneously provided fluid cooling of one side of the coupling surfaces along with oil lubrication of the mating side thereof to provide a mixed boundary contact between the coupling members. The art seems to teach that if you use oil lubrication for a coupling then there is no need for water cooling as the lubricating oil also acts as a cooling fluid. However, it has been found that the simultaneous use of a cooling fluid with oil lubrication effectively cools the coupling and the lubricating fluid, making the lubricating fluid a more effective lubricant due to the lower operating temperature.

The use of water as a cooling medium in an oil lubricated coupling provides the same advantages of a normal oil lubricated coupling but with far greater heat dissipating capabilities. Water has a higher film coefficient than oil and a higher specific heat and therefore absorbs heat better than oil and acts as a better heat transfer medium. For example, a 20 H.P. coupling needs an oil flow therethrough of 8 gal./min. with about a 30 gallon reservoir while the same size coupling cooled with water needs only about a 2 gal./min. flow. Thus, the water cooled oil lubricated coupling can be used with a much lower fluid flow therethrough when water is being used as a cooling medium. Since a relatively small flow of water is needed for cooling, there is no need to recirculate the water as one would recirculate the oil if it were used for cooling. Additionally, since the water is not recirculated, there is no need for a heat exchanger as is used in an oil cooled coupling where the heat exchanger is used to cool the recirculated oil. The use of a heat exchanger to cool the oil is inefficient as the heat is first transferred to the oil from the coupling and then from the oil through the heat exchanger to either air or water which is used to cool the heat exchanger. In Applicant's invention the heat is transferred more efficiently from the coupling directly to water.

The utilization of Applicant's structure provides a completely enclosed coupling having high torque and energy capacity wherein water cooling of the coupling members occurs. Since the cooling water is separated from the coupling surfaces and lubricant flow, it does not become contaminated. Since the cooling fluid does not become contaminated, the need for a closed recirculation system can be eliminated as regular tap water can be continuously circulated throughout the cooling passageways of the coupling and then directed to drain. Also, since the lubricant is cooled by the cooling fluid, there is no need for a heat exchanger to cool the lubricating fluid.

SUMMARY OF THE INVENTION

The present invention relates to an improved coupling including a driving member, a driven member rotatable relative to the driving member and first and second torque transmitting members, one of which is associated with the driving member and the other of which is associated with the driven member. The first and second torque transmitting members have an engaged position establishing a driving relationship between the driving and driven members and a disengaged position. Actuating means is provided for moving one of the driving and driven members relative to the other to effect relative movement of the first and second torque transmitting members from the disengaged position toward the engaged position. The first torque transmitting member includes a first torque transmitting surface which is adapted to engage with the second torque transmitting member and a second surface disposed remote from the first surface. A first fluid passageway is provided for directing the flow of cooling fluid to the second surface of the first torque transmitting member to effect cooling thereof and a second fluid passageway is provided for directing the flow of lubricating fluid to the first torque transmitting surface of the first torque transmitting member and to the second torque transmitting member to provide for a mixed boundary contact between the first torque transmitting surface of the first torque transmitting member and the second torque transmitting member when the first and second torque transmitting members are in their engaged position.

Another provision of the present invention is to provide a new and improved coupling as set forth in the next proceeding paragraph wherein the first torque transmitting member is a metallic cone having the first torque transmitting surface disposed on the exterior thereof and the second surface disposed on the interior thereof. The cooling fluid is directed through the first fluid passageway to directly engage the second surface of the first torque transmitting member to cool the first torque transmitting member.

Still another provision of the present invention is to provide a new and improved coupling including a driving member, a driven member rotatable relative to the driving member, a rotor having a cone shaped torque transmitting surface thereon connected to the driving member for rotation therewith and movable relative thereto in an axial direction and a cone member connected to the driven member and having a cone shaped torque transmitting surface on the exterior thereof and an interior surface disposed substantially parallel to the cone shaped exterior torque transmitting surface. The cone shaped torque transmitting surface of the rotor is engageable with the cone shaped torque transmitting surface of the cone member when a driving relationship is established between the driving and driven members. A first fluid passageway is provided for communicating with the interior surface of the cone member for directing the flow of cooling fluid to engage directly with the interior surface of the cone member to effect cooling thereof and a second fluid passageway is provided for communicating with the cone shaped torque transmitting surface of the cone member and the cone shaped torque transmitting surface of the rotor for directing the flow of lubricating fluid to the cone shaped torque transmitting surfaces to provide for a mixed boundary contact therebetween when a driving relationship is established between the driving and driven members.

Another provision of the present invention is to provide a new and improved coupling including a driving member, a driven member rotatable relative to the driving member, and a disc shaped rotor connected to the driving member for rotation therewith and movable in an axial direction relative to the driving and driven members. The rotor includes first and second torque transmitting surfaces disposed on opposite sides thereof. First and second plate members and provided connected to the driven member with each of the plate members having a first torque transmitting surface on one side thereof and a second surface disposed substantially parallel to the first torque transmitting surface on the opposite side thereof, with the first torque transmitting surface of the first plate being engageable with the first torque transmitting surface on the rotor and first torque transmitting surface on the second plate being engageable with the second torque transmitting surface on the rotor to establish a driving relationship between the driving and driven members. A first fluid passageway is disposed in the driven member for directing the flow of cooling fluid to engage directly with the second surfaces of the first and second plate members to effect cooling thereof and a second fluid passageway is disposed in the driven member for providing for lubricating fluid to the first torque transmitting surfaces of the plate members and the first and second torque transmitting surfaces of the rotor to establish a mixed boundary contact between the first torque transmitting surfaces of the plate members and the first and second torque transmitting surfaces of the rotor when a driving engagement is established between the driving and driven members. Piston means is also provided to effect engagement of the first torque transmitting surfaces of the plate members with the first and second torque transmitting surfaces of the rotor and a third fluid passageway is disposed in the driven member for providing for the flow of fluid to actuate the piston means.

DESCRIPTION OF THE DRAWINGS

FIG. 1 is a partially cross sectioned side view of a preferred embodiment of the present invention utilized in a cone coupling.

FIG. 2 is a fragmentary partially cross sectioned view of the upper half of a plate coupling utilizing the present invention.

DESCRIPTION OF THE PREFERRED EMBODIMENT

Referring to FIG. 1, a coupling 10 of the present invention is illustrated. The coupling 10 is illustrated as having a driving or input member 12 and a driven or output member 14. In the preferred embodiment of the invention, the coupling 10 is illustrated as a brake wherein the driven or output member 14 is adapted to be fixed to a rigid support structure, not illustrated, and the input member 12 is rotatable thereto. While the present embodiment has been disclosed as a brake, it should be appreciated that the term "coupling" also encompasses a clutch mechanism wherein the output member 14 is allowed to rotate rather than being fixed as is in the present brake embodiment.

Splined at 15 to the input shaft 12 for rotation therewith is a rotor 16. The rotor 16 is slidable along the splined connection 15 relative to the shaft 12 in a direction parallel to the axis of rotation of the coupling 10. The driven member 14 includes first and second non rotatable housing members 18 and 20 which are connected by a plurality of suitable bolts 22 to form a fluid tight housing which protects the coupling from contamination. The bolts 22 can also be utilized to fix the housing 14 to a suitably rigid structure, not illustrated, to rigidly support the coupling 10.

A plurality of bearings 58 are located between the bearing races 60 which are connected to the input shaft 12 and housing 14 for rotation therewith. The bearings 58 provide for rotation of the input member 12 and rotor 16 relative to the fixed housing 14.

A cone member 24 is secured in a fluid tight relationship to the housing member 18. Preferably the cone member 24 is soldered at its end portions 25 to permanently secure the cone member 24 to housing member 18 and define a permanently sealed fluid passageway 28 therein. The use of a core shaped member as a torque transmitting member provides a large cooling area and a large torque transmitting area in a small envelope due to the undulations therein. The cone member 24 is preferably constructed of a copper alloy and includes an interior surface 26 and an exterior torque transmitting surface 27. The interior surface 26 cooperates with the housing member 18 to define the sealed annular fluid passageway 28 which is adapted to receive cooling fluid therein. The annular fluid passageway 28 includes an inlet 30, schematically illustrated, and an outlet 32. A cooling fluid, preferably water, is directed into the inlet 30 and circulates through the sealed annular cooling passageway 28 and out of the outlet 32. The flow of cooling water through cooling passageway 28 cools the copper cone member 24 as will be more fully described herein below. Since the fluid passageway 28 is sealed, the cooling fluid flowing therethrough will not suffer any contamination and can be directed to an ordinary drain without any processing to purify the water.

The rotor 16 includes a cone shaped exterior torque transmitting surface 34. The cone shaped exterior surface 34 of the rotor 16 is adapted to mate with the cone shaped exterior surface 27 of the cone member 24 to effect a driving relationship between the input or driving member 12 and the output or driven member 14. While the rotor 16 and torque transmitting surface 34 are illustrated as a continuous annular member and continuous annular surface, respectively, it should be appreciated that the member 16 and surface 36 could have slots disposed therein to insure adequate lubricant flow to the torque transmitting surfaces 27, 34.

A lubricating fluid passageway 36 is defined interiorally of the housing 14 and provides for fluid lubrication of the torque transmitting surface 34 of the rotor 16 and the torque transmitting surface 27 of the cone member 24. A fluid inlet 38 directs the flow of lubricating fluid, preferably oil, into the fluid passageway 36 and a fluid outlet 40 is provided to remove the lubricant from the passageway 36. A continuous flow of lubricant may be provided through the fluid passageway 36 to lubricate the torque transmitting surfaces 27, 34 or a lubricant reservoir may be established in the fluid passageway 36 in the bottom of the housing 14 and the torque transmitting surfaces 27, 34 may pass through the reservoir to effect lubrication thereof.

The presence of lubricant in passageway 36 prevents direct contact between the exterior torque transmitting surface 27 of the cone 24 and the exterior torque transmitting surface 34 of the rotor 16 when a driving relationship is established between the driving and driven members 12, 14. The lubricant disposed between the cone torque transmitting faces 27 and 34 allows for a mixed boundary contact between the rotor 16 and cone member 24 when the rotor 16 and cone 24 are in their engaged position as is illistrated in FIG. 1. The mixed boundary contact is provided by a film of lubricant between the torque transmitting surfaces 27 and 34 which essentially prevent direct metal to metal contact between the torque transmitting surfaces to prevent wear thereof. The lubricant film on the torque transmitting surfaces 27, 34 essentially provides for a fluid coupling of the rotor 16 and cone member 24 when the rotor and cone members are in their engaged positon. If desirable, suitable surface grooves, not illustrated, can be located in one of the torque transmitting surfaces 27 and 34 to provide for the additional flow of lubricant over and between the mating cone torque transmitting surfaces 27, 34 to prevent direct frictional contact therebetween. While the torque transmitting surfaces 27, 34 have been described as engaged herein, it should be appreciated that engaged as used herein shall refer to the mixed boundary contact which is established between the torque transmitting surfaces 27, 34.

A piston 42 is located within a cylindrical piston chamber 44 disposed in the portion 20 of the housing 14. A fluid passageway 46 is provided for directing the flow of fluid, preferably air, into the piston chamber 44 to effect axial movement of the piston 42 toward the left as is illustrated in FIG. 1. A thrust bearing 48 is disposed between the piston 42 and the rotor 16 to transmit axial motion from the piston 42 to the rotor 16. A suitable seal 50, illustrated as O-rings 50, are provided to seal the piston cylinder 44 and the piston 42. The introduction of high pressure fluid into the fluid passageway 46 will effect movement of the piston 42 toward the left as illustrated in FIG. 1. Movement of the piston 42 will effect movement of the thrust bearing 48 and movement of the rotor 16 toward the left as is illustrated in the figures. Movement of the rotor 16 toward the left will effect a mixed boundary engagement between the torque transmitting surface 34 of the rotor 16 and the torque transmitting surface 27 of the cone 24 thereby effecting engagement of the rotor 16 and cone 24 to establish a driving relationship between the driving shaft 12 and the driven member 14.

The rotor 16 includes a plurality of spaced apart cavities 54 therein, one of which is illustrated, and each of which is adapted to receive a spring member 52 therein. A plate 56 is rigidly connected to the input shaft 12 and rotor 16 for rotation therewith. The plate 56 does not rotate relative to the cavity 54 and spring 52. The spring 52 exerts a biasing force between the fixed plate member 56 and the axially movable rotor 16 to bias the rotor 16 against the force of the piston 42. The spring 52 effects movement of the rotor 16 to its position in which the torque transmitting surface 34 of the rotor 16 is disengaged from the torque transmitting surface 27 of the cone 24 when fluid pressure is released from the piston cylinder 44.

The fluid passageway 36 for directing lubricating fluid to the torque transmitting surfaces 27 and 34 of the cone 24 and rotor 16, respectively, is completely enclosed within the housing 14. This prevents external contaminants from engaging with the torque transmitting surfaces of the cone 24 and rotor 16. Additionally, the flow of lubricant between the torque transmitting surfaces 27, 34 essentially eliminates friction contact between the rotor 16 and cone 24 by providing a mixed boundary contact which essentially provides for viscous coupling of the rotor 16 and cone 24. Such a construction eliminates the need for friction material on torque transmitting surfaces of the cone 24 and rotor 16. The elimination of friction material reduces servicing of the coupling 10 because there is no friction material to wear and contaminate the lubricant, replace, or adjust. Since a mixed boundary contact is provided between the rotor 16 and cone 24, the noise associated with engaging friction surfaces is eliminated and the coupling has a significantly lower noise level than known friction couplings.

The fluid passageway 28 for providing cooling fluid to the coupling 10 allows the cooling fluid to directly impinge with the interior surface 26 of the copper cone member 24. The direct contact of the cooling fluid with surface 26 provides for direct heat transfer from the cone 24 to the cooling medium. Since the heat generated by coupling 10 is generated at the torque transmitting surfaces 27, 34, the water flow through passageway 28 provides for efficient dissipation of the heat generated due to the fact that the water impinges directly with the surface 26 of the core member 24. Since the core 24 is preferably constructed of copper, which has a relatively low resistance to heat flow, heat transfer from the torque transmitting surface 27 to the surface 26 will be rapid.

The construction of the present coupling allows the water cooling passageway 28 to be completely sealed relative to the housing 14 to eliminate leaks and contamination of the water by the oil. Since water is directed through the water inlet 30 through the passageway 28 and out of the water outlet 32, a continuous flow of water can be utilized without contamination thereof. This would eliminate the need to recirculate water through a heat exchanger which would further increase the energy requirements of the coupling 10.

Referring to FIG. 2, another embodiment of the present invention is illustrated. The coupling 70, illustrated in FIG. 2, is disclosed as a brake; however, it should be apparent to one skilled in the art that the same concepts embodied in the brake of FIG. 2 could also be embodied in a clutch having a generally similar construction. The coupling 70 includes a driving or input shaft 72 and a driven or output member housing 74. The housing 74 is adapted to be rigidly supported by suitable fastener means, not shown. The housing 74 includes the members 76, 78 and 80, which are connected by a plurality of bolts 82 which extend therethrough to rigidly affix the members 76, 78, and 80 together.

A disc rotor 84 is splined at 83 to the input shaft 72 for rotation therewith. The rotor 84 is movable in a direction parallel to the axis of rotation along the splines 83 of the input shaft 72. The rotor 84 includes a first annular torque transmitting surface 85 on one side thereof and a second substantially parallel torque transmitting surface 87 on the opposite side thereof. Bearings 86 are supported in bearing races 88 attached to the input shaft 72 and the housing 74 in a well known manner. The bearings 86 provide for relative rotation between the input shaft 72 and the housing 74. A bevel spring 90 is disposed between one of the bearing races 88 and the rotor 84 to bias the rotor 84 toward the right as is viewed in FIG. 2.

A pair of plate members 92, 94 are attached to the housing 74 for movement therewith. The plate members 92, 94 are preferably constructed of copper to allow for rapid heat transfer therethrough. The plate member 92 is supported by the housing member 76 in a fixed position and includes an interior surface 91 and an exterior torque transmitting surface 93. The plate member 94 is supported by a water jacket 96. The plate member 94 includes an exterior surface 95 and an exterior torque transmitting surface 97. The water jacket 96 is splined to the portion 78 of the housing 74 by the splines 98. The splines 98 on the water jacket 96 and the housing portion 78 allow movement of the water jacket 96 in a direction parallel to the axis of rotation.

A piston 100 is supported in a piston chamber 102 located in the housing portion 80. A fluid inlet 104 is provided to the piston chamber 102 to direct fluid flow therein. The introduction of high pressure fluid, preferably air, through the inlet 104 into the piston 102, will cause the piston 100 to move toward the left, as is illustrated in FIG. 2. Movement of the piston 100 toward the left will cause the water jacket 96 to move toward the left along the splines 98 until the torque transmitting surface 97 of the plate 94 engages with torque transmitting surface 87 of the rotor 84. Further movement of the piston 100 will cause the water jacket 96 to slide the rotor 84 toward the left along its splined connection 83 to effect engagement of the torque transmitting surface 85 of the rotor 84 with the torque transmitting surface 93 of the plate 92, as will be described hereinbelow in detail. A spring, not illustrated, is disposed between the housing and the plate member 94 to bias the plate member 94 to the right as viewed in FIG. 2 to bias the torque transmitting surface 97 of plate 94 away from the torque transmitting surface 87 of rotor 84. The spring and spring 90 act to bias the rotor 84 and plate 94 to disengage torque transmitting surfaces 87, 97 and 93, 85 when fluid pressure is released from piston chamber 102.

A fluid passageway 110 is disposed in the housing 74 to provide for the flow of cooling fluid, preferably water, therethrough. The fluid passageway 110 directs the water to impinge directly with the interior surfaces 91 and 95 of the plate members 92 and 94, respectively. The fluid passageway 110 includes a fluid inlet 112 which directs fluid flow into the passageway 110 and a fluid outlet, not illustrated, preferably located in the bottom portion of the housing 74. The fluid passageway 110 directs the flow of cooling fluid into a chamber 114 defined between the annular plate member 92 and the member 76 of the housing 74. The fluid flow in chamber 114 is in direct contact with the surface 91 to effect cooling of the copper plate 92 and the torque transmitting surface 93. An annular chamber 116 is disposed between the water jacket 96 and the annular plate 94. A suitable connection, not illustrated, is provided in the housing 74 to interconnect the fluid chambers 114 and 116. This interconnection will allow the cooling fluid to sequentially flow through the fluid passageway 110, through the annular chamber 114 to effect cooling of the torque transmitting surface 93 of plate 92, through the interconnection, through the annular chamber 116 to effect cooling of the torque transmitting surface 97 of the annular plate 94, and to water outlet, not illustrated. The flow of cooling fluid through the fluid passageway 110 and chambers 114, 116, will provide for efficient dissipation of the heat generated upon coupling of the input shaft 72 to the housing 74 upon engagement of the torque transmitting surfaces 85 and 87 of the rotor with the torque transmitting surfaces 93 and 97 of the plates 92 and 94, respectively.

A fluid passageway 120 is provided for directing a flow of lubricating fluid between the torque transmitting surfaces of the rotor 84 and the torque transmitting surfaces of the plate members 92, 94. A fluid inlet 122 is provided for directing the flow of lubricating fluid to the passageway 120. The flow of lubricant in the passageway 120 can be continuous as in the passageway 36 of the coupling 10 or it may be accumulated in a lubricant reservoir in the bottom of the housing, not illustrated. The lubricant will function to coat the torque transmitting surfaces 85, 87 of the rotor 84 and the torque transmitting surfaces 93, 97 of plates 92, 94. The flow of lubricant through the passageway 120 provides for mixed boundary contact between the torque transmitting surfaces of the plates 92, 94 and the torque transmitting surfaces of the rotor 84.

A plurality of grooves 124 can be provided in the torque transmitting surfaces 93 and 97 of the plates 92 and 94, respectively, to further provide for lubricant flow between the torque transmitting surfaces of the plates 92, 94 and the torque transmitting surfaces of the rotor 84.

While the torque transmitting surfaces of the plates 92, 94 and the rotor 84 have been described as engaging, it should be apparent that this description refers to a mixed boundary contact which is established when a driving relationship is established between the input shaft 72 and the housing 74. A mixed boundary contact will eliminate the need for friction material on the torque transmitting surfaces of the rotor 84 and the plate members 92, 94, thereby eliminating potential wear of the friction material and adjustment problems associated therewith as discussed hereinabove.

It should be apparent that the introduction of air pressure into the inlet 104 will cause the piston chamber 102 to expand as the piston 100 moves toward the left as is illustrated in FIG. 2. Movement of the piston 100 toward the left will effect movement of the water jacket 96 and plate 94 toward the left to effect engagement of the torque transmitting surface 87 of the rotor with the torque transmitting surface 97 of the plate 94. Further movement of the piston 100 toward the left will cause further movement of the water jacket 96 toward the left to move the rotor 84 toward the left until the torque transmitting surface 85 thereof engages with the torque transmitting surface 93 of the plate 92. At that time a mixed boundary contact will be established between the torque transmitting surfaces 93, 97 of the plates 92, 94 and the torque transmitting surfaces 85, 87 of the rotor 84 to thereby couple the driving and driven members together.

The embodiment of the clutch illustrated in FIG. 2 has many of the same advantages associated with the clutch illustrated in FIG. 1. Because the clutch is completely enclosed, contamination of the torque transmitting surfaces is prohibited. Additionally, the flow of lubricating fluid over the torque transmitting surfaces of the rotor 84 and plates 92, 94 eliminates the need for friction material and its associated replacement or adjustment. Since friction material is not utilized, the noise associated with the friction contact between the rotor and plates 92, 94 will be eliminated and a coupling 70 will be provided which has a lower operating noise level than known friction clutches. Additionally, the fluid passageway for directing the cooling water through the coupling is completely sealed with eliminates potential leaking problems. If a lubricant reservoir is provided within the coupling housing, no lubricant pump is necessary. An additional advantage of the present structure is that the cooling fluid is isolated from the torque transmitting surfaces of the coupling. Therefore, the cooling fluid will not be contaminated as it passes through the coupling to effect cooling of the torque transmitting surfaces thereof. Since the water for cooling the coupling is not contaminated, it can be dumped directly into a sewer line and the need for recirculating the water and the requirement for a heat exchanger to effect cooling thereof is eliminated. While the present invention has been described in both a plate coupling and a cone coupling, it should be appreciated that equivalent embodiments could be utilized in other couplings such as a drum coupling.

From the foregoing it should be apparent that a new and improved coupling has been provided. The coupling includes a driving member, a driven member rotatable relative to the driving member, and first and second torque transmitting members, one of which is associated with the driving member and the other of which is associated with the driven member. The first and second torque transmitting members have an engaged position establishing a driving relationship between the driving and driven members and a disengaged position. An actuator in the form of a piston is provided for moving one of the torque transmitting members relative to the other of the torque transmitting members in a direction parallel to the axis of rotation. The first torque transmitting member includes a first torque transmitting surface which is adapted to engage with the second torque transmitting member when the first and second torque transmitting members are in their engaged position and a second surface disposed remote from the first surface. A first fluid passsgeway is provided for directing the flow of cooling fluid therethrough to the second surface of the first torque transmitting member to effect cooling thereof and a second fluid passageway is provided for directing the flow of lubricating fluid therethrough to lubricate the first torque transmitting surface of the first torque transmitting member and the second torque transmitting member to provide for a mixed boundary contact between the first surface of the first torque transmitting member and the second torque transmitting member when the first and second torque transmitting members are in an engaged position.

What I claim is:

1. A coupling comprising a driving member, a driven member rotatable relative to said driving member about an axis of rotation, first and second torque transmitting members, one of said driving and driven members having said first torque transmitting member attached thereto for movement therewith and the other of said driving and driven members having said second torque transmitting member attached thereto for movement therewith, said first and second torque transmitting members having an engaged position establishing a driving relationship between said driving and driven member and a disengaged position permitting relative rotation between said driving and driven members, actuating means for moving one of said first and second torque transmitting members relative to the other of said first and second torque transmitting members to effect movement of said first and second torque transmitting members from said disengaged position to said engaged position, said first torque transmitting member having a first surface which is adapted to engage with said second torque transmitting member when said first and second torque transmitting members are in said engaged position and a second surface disposed remote from said first surface, said first and second torque transmitting members generating heat in said second torque transmitting member and at said first and second surfaces of said first torque transmitting member when in said engaged position, first fluid passageway means for providing for the flow of cooling fluid therethrough, said first fluid passageway means communicating with said second surface of said first torque transmitting member to direct cooling fluid to engage with said second surface to effect cooling of said first and second surfaces of said first torque transmitting member, second fluid passageway means communicating with said first surface of said first torque transmitting member and said second torque transmitting member and providing for the flow of lubricating fluid therethrough, said second fluid passageway means directing lubricating fluid to said first surface of said first torque transmitting member and to said second torque transmitting member to provide for a mixed boundary contact between said first surface of said first torque transmitting member and said second torque transmitting member when said first and second torque transmitting members are in said engaged position, said lubricating fluid being heated by said heat generated at said second torque transmitting member and in said first surface of said first torque transmitting member when said first and second torque transmitting members are in said engaged position said cooling fluid cooling said first and second surfaces of said first torque transmitting member to effect cooling of said lubricating fluid which engages said first surface of said first torque transmitting member.

2. A coupling as defined in claim 1 wherein said first torque transmitting member is a metallic cone member having said first surface disposed on the exterior thereof for engagement with said second torque transmitting member and said second surface disposed on the interior thereof and in direct contact with said cooling fluid in said first fluid passageway means, said second surface being disposed substantially parallel to said first surface and operable to direct heat from said first surface to said cooling fluid in said first passageway means.

3. A coupling as defined in claim 2 wherein said second torque transmitting member is a cone member having an external configuration which mates with said first surface of said first torque transmitting member to enable said first and second torque transmitting members to couple upon engagement thereof.

4. A coupling as defined in claim 3 wherein said first and second torque transmitting members each include at least two mating cones thereon for increasing the torque transfer capability of the first and second torque transmitting members.

5. A coupling as defined in claim 3 wherein said actuating means includes a piston member movable parallel to said axis of rotation and a piston cylinder and further including a third fluid passageway communicating with said piston cylinder for effecting movement upon the application of fluid pressure therein of said piston member in a direction parallel to the axis of rotation to thereby bias said first and second torque transmitting members in a direction parallel to the axis of rotation toward said engaged position.

6. A coupling as defined in claim 5 further including spring means for biasing said first and second torque transmitting members against said fluid pressure in said piston cylinder and said third fluid passageway toward said disengaged position.

7. A coupling as defined in claim 1 wherein said first torque transmitting member is a plate member having said first and second surfaces disposed substantially parallel to each other on opposite sides thereof with said first surface being operable to engage with said second torque transmitting member and said second surface disposed in direct contact with said cooling fluid in said first fluid passageway.

8. A coupling as defined in claim 7 further including a third torque transmitting member operatively connected to said first torque transmitting member for rotation therewith and movable in an axial direction relative to said first torque transmitting member and said second torque transmitting member to couple said driving and driven members when said first, second and third torque transmitting members are engaged, said third torque transmitting member being a plate member having first and second substantially parallel surfaces disposed thereon with said first surface of said third torque transmitting member being operable to engage with said second torque transmitting member and said second surface of said third torque transmitting member being disposed in direct contact with said cooling fluid in said first fluid passageway.

9. A coupling as defined in claim 8 wherein said second torque transmitting member is a disc member movable relative to said first and third torque transmitting members in a direction substantially parallel to the axis of rotation and having first and second substantially parallel surfaces thereon with said first surface of said second torque transmitting member being operable to engage with said first surface of said first torque transmitting member and said second surface of said second torque transmitting member being operable to engage with said first surface of said third torque transmitting member when a driving relationship is established between said driving and driven members, and said first surface of said second torque transmitting member being spaced apart from said first surface of said first torque transmitting member and said second surface of said second torque transmitting member being spaced apart from said first surface of said third torque transmitting member when said driving and driven members are not in said driving relationship.

10. A coupling as defined in claim 9 wherein said actuating means includes a piston member movable in a direction parallel to the axis of rotation and a piston cylinder operatively connected to said first torque transmitting member to rotate therewith relative to said second torque transmitting member, and further including a third fluid passageway communicating with said piston cylinder for effecting movement upon the application of fluid pressure therein of said piston member in an axial direction, movement of said piston member upon the application of fluid pressure thereto effecting axial movement of said third torque transmitting member and said second torque transmitting member relative to said first torque transmitting member to effect engagement of said first surface of said first torque transmitting member with said first surface of said second torque transmitting member and engagement of said second surface of said second torque transmitting member with said first surface of said third torque transmitting member to establish a driving relationship between said driving and driven members.

11. A coupling as defined in claim 10 further including spring means for biasing said second torque transmitting member and said third torque transmitting member in an axial direction against the force of fluid pressure in said piston cylinder to bias said second torque transmitting member and said third torque transmitting member toward their position in which said driving and driven members are not in said driving relationship.

12. A coupling comprising a driving member, a driven member rotatable relative to said driving member about an axis of rotation, a rotor having a cone shaped torque transmitting surface thereon, said rotor being connected to said driving member for rotation therewith and movable relative thereto in an axial direction, a cone member connected to said drive member and having a cone shaped torque transmitting surface on the exterior thereof and an interior surface disposed substantially parallel to said cone shaped torque transmitting surface, said cone shaped torque transmitting surface of said rotor being engageable with said cone shaped torque transmitting surface of said cone member when a driving relationship is established between said driving and driven members and said cone shaped torque transmitting surface of said rotor being spaced apart from said cone shaped torque transmitting surface of said cone member when said driving and driven members are not in a driving relationship, said rotor and said cone member generating heat when said cone shaped torque transmitting surface of said rotor is engaged with said cone shaped torque transmitting surface of said cone member, a first fluid passageway communicating with said interior surface of said cone member for directing the flow of cooling fluid to engage directly with said interior surface of said cone member to effect cooling thereof, a second fluid passageway communicating with said cone shaped torque transmitting surface of said cone member and said cone shaped torque transmitting surface of said rotor for providing for lubricating fluid at said cone shaped torque transmitting surfaces to provide for a mixed boundary contact between said cone shaped torque transmitting surfaces when a driving relationship is established between said driving and driven members, said cooling fluid cooling said cone member to effect cooling of said lubricating fluid which engages said cone shaped torque transmitting surface of said cone member.

13. A coupling as defined in claim 12 further including piston means disposed in said driven member, said piston means including a piston member and a piston cylinder, said piston member being movable relative to said piston cylinder in a direction substantially parallel to said axis of rotation to effect axial movement of said rotor, and a third fluid passageway disposed in said drive member for directing fluid flow to said piston cylinder to effect axial movement of said piston and said rotor to effect engagement of said cone shaped torque transmitting surface of said rotor with said cone shaped torque transmitting surface of said cone member to establish a driving relationship between said driving and driven members.

14. A coupling comprising a driving member, a driven member rotatably relative to said driving member about an axis of rotation, a disc shaped rotor connected to said driving member for rotation therewith, said rotor being movable in an axial direction relative to said driving and driven members, said rotor including first and second torque transmitting surfaces disposed on opposite sides thereof with said first and second torque transmitting surfaces being disposed substantially parallel to each other, first and second plate members connected to said driven member, each of said first and second plate members having a first torque transmitting surface on one side thereof and a second surface disposed substantially parallel to said first torque transmitting surface on the opposite side thereof, said rotor being interposed between said first torque transmitting surfaces of said first and second plate members, said first torque transmitting surface of said first plate member being engageable with said first torque transmitting surface of said rotor and said first torque transmitting surface of said second plate member being engageable with said second torque transmitting surface of said rotor to establish a driving relationship between said driving and driven members, said rotor and said first and second plate members generating heat therein upon a driving relationship being established between said driving and driven members, first fluid passageway means disposed in said driven member and communicating with said second surfaces of said first and second plate members for directing the flow of cooling fluid to engage directly with said second surfaces of said first and second plate members to effect cooling thereof, a second fluid passageway disposed in said driven member and communicating with said first torque transmitting surfaces of said first and second plate members and with said first and second torque transmitting surfaces of said rotor for providing for lubricating fluid at said first torque transmitting surfaces of said first and second plate members and said first and second torque transmitting surfaces of said rotor, said cooling fluid engaging with said second surface of said first and second plate members effecting cooling of said lubricating fluid which engages said first torque transmitting surfaces of said first and second plate members, piston means for effecting engagement of said first torque transmitting surfaces of said first and second plate members with said first and second torque transmitting surfaces of said rotor to establish a driving relationship between said driving and driven members and third fluid passageway means disposed in said driven member for actuating said piston means.

15. A coupling as defined in claim 14 wherein said piston means includes a piston cylinder disposed in said driven member and a piston member located within said piston cylinder, said piston member being movable in an axial direction upon the application of fluid pressure through said third fluid passageway means to said piston cylinder to effect engagement of said first torque transmitting surfaces of said plate members with said first and second torque transmitting surfaces of said rotor to establish a driving relationship between said driving and driven members.

16. A coupling as defined in claim 15 further including a plate support member for supporting one of said plate members thereon with said first torque transmitting surface of said plate member disposed adjacent said second torque transmitting surface of said rotor and said second surface of said plate member disposed adjacent said plate support member, said first fluid passageway being in part disposed in said plate support member to effect cooling of said second surface of said plate member supported by said plate support member said plate support member engaging with said piston member and movable therewith in an axial direction to effect engagement of said first torque transmitting surfaces of said plate members with said first and second torque transmitting surfaces of said rotor upon movement of said piston member to establish a driving relationship between said driving and driven members.

* * * * *